United States Patent [19]

Bertozzi et al.

[11] Patent Number: 4,707,766

[45] Date of Patent: Nov. 17, 1987

[54] MODULAR, COMPOSABLE LIGHTING PROJECTOR FOR ILLUMINATION FROM THE GROUND

[75] Inventors: Marcello Bertozzi; Roberto Casamento, both of Rome, Italy

[73] Assignee: Quarzcolor Ianiro S.p.A., Rome, Italy

[21] Appl. No.: 741,683

[22] Filed: Jun. 5, 1985

[30] Foreign Application Priority Data

Jun. 7, 1984 [IT] Italy .............................. 35870/84[U]

[51] Int. Cl.[4] .............................................. G03B 15/02

[52] U.S. Cl. ...................................... 362/11; 362/362; 362/238

[58] Field of Search ................. 362/11, 238, 239, 249, 362/250, 281, 252, 236, 237, 268, 362, 367, 427, 368, 310, 294, 226

[56] References Cited

U.S. PATENT DOCUMENTS

| | | | |
|---|---|---|---|
| 1,900,807 | 3/1933 | Fegley | 362/249 |
| 4,117,456 | 9/1978 | Albrecht | 362/362 |
| 4,232,359 | 11/1980 | Leon | 362/281 |
| 4,302,800 | 11/1981 | Pelletier | 362/252 |
| 4,389,699 | 6/1983 | Qualls | 362/250 |
| 4,488,205 | 12/1984 | Quiogue | 362/362 |
| 4,511,953 | 4/1985 | Fage | 362/249 |
| 4,531,180 | 7/1985 | Hernandez | 362/362 |

*Primary Examiner*—Carl Stuart Miller
*Attorney, Agent, or Firm*—Mason, Fenwick & Lawrence

[57] ABSTRACT

A modular, composable lighting projector for illumination from the ground in theatres, or in photographic, motion-picture and television studios, and the like, said lighting projector consisting of a housing that shows a small window in its front side, which window incorporates the bulb-mirror set, as well as louvers for ventilation in its top side, said projector being characterized in that it comprises hinge receiving means on a back upright edge, hinge insertion means on the other back upright edge, a hooking device fastened near a lower front corner and hooking means complementary to said hooking device at a position close to the other lower front corner.

2 Claims, 4 Drawing Figures

MODULAR, COMPOSABLE LIGHTING PROJECTOR FOR ILLUMINATION FROM THE GROUND

DISCLOSURE OF THE INVENTION

The present invention relates to a lamp housing for lighting in theaters or photographic, motion-picture or television studios.

More particularly, the present invention relates to a modular lamp housing, said modular housing being adapted to secure a plurality thereof together to form a unitary structure whose main operative feature is a large versatility and the easy way of supplying power to the same.

At present there are used banks consisting of a plurality of lamp housings, for example. of four single units assembled into a single body, in order to obtain the possibility of lighting from the ground in particular kinds of work or for particular shooting purposes in motion-picture or photographic studios. Such composite lamp housing structure, though easily connectable for power supplying purposes, are hardly maneuverable owing to their sizes and weights.

The present invention avoids said drawback by providing a single lamp housing of a modular structure, which can be composed with a desired number of similar housing so as to obtain composite structures suitable for various lighting requirements.

More particularly, it is an object of the present invention to realize a lamp housing having a small window in its front side and containing a bulb-mirror with louvers for ventilation purposes in another side, said housing comprising hinge receiving means on a back upright edge, hinge insertion means on the other back upright edge, a hook device close to a loawer front corner and hooking means complementary to said hook device, at a position close to the other lower front corner.

In the case of a lamp housing of such structure, the hinge and hook means allowed to secure together a plurality of said housings so as to form an interconnected housing set, adapted also to be oriented each in any desired direction and to realize any desired housing configuration, for instance an arcuate, concave or convex configuration, to satisfy particular illumination requirements.

Figure 1:
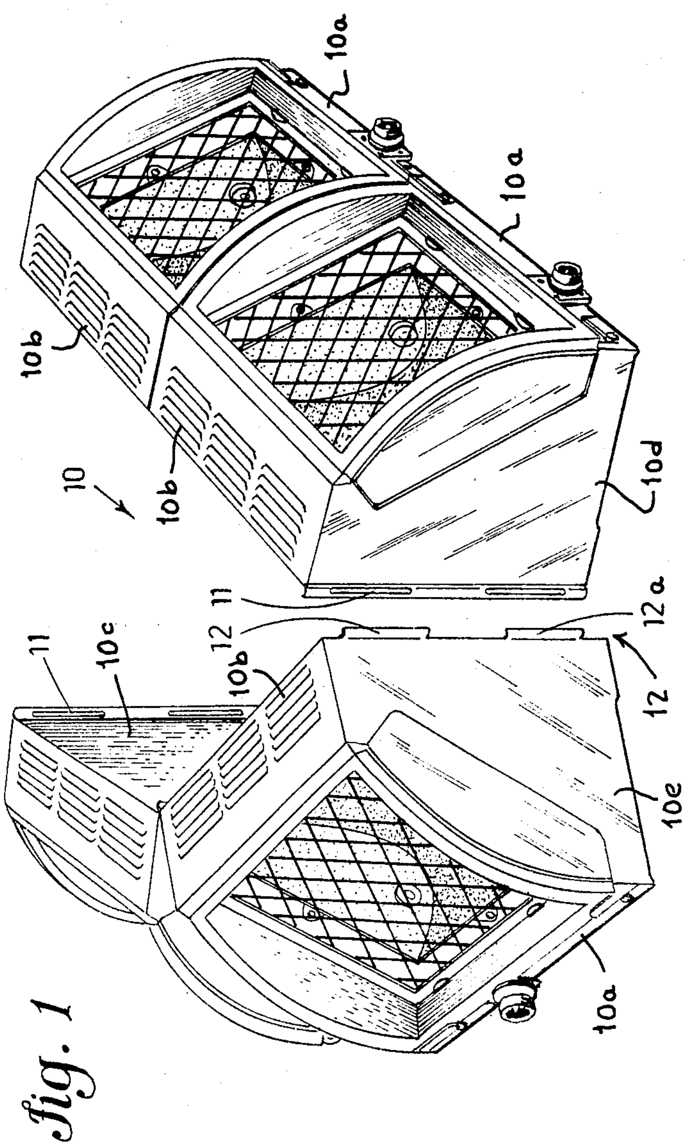

Further details and advantages will result from the following disclosure considered with reference to the enclosed drawings in which the preferred embodiment is shown by way of example and in which:

FIG. 1 shows two sets each of two lamp housings according to the present invention, arranged in two different configurations.

FIG. 2*a* shows a diagrammatic plan view of a single housing according to the invention.

FIGS. 2*b*, 2*c* and 2*d* show three different configurations of a row of four lamp housings, viz a straight line configuration (b), an arcuate convex configuration (c), and an arcuate concave configuration.

Figure 3:
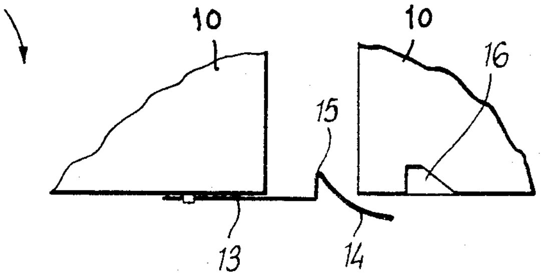

FIG. 3 shows a plan view of adjacent edges of two lamp housings to be connected with one another by the front hooking means according to the invention.

FIGS. 4*a* and 4*b* show diagrammatic plan top views illustrating the operation of the hook means of the invention.

With reference to the drawings it can be seen that the lamp housing 10 according to the present invention comprises a small window in its front side, said housing containing the commonly used arrangement of bulb and mirror. Louvers for ventilation are provided in the upper wall of the housing. The front side of the housing is rounded, so that said small window opens both forward and upward.

The housing 10 forms a module having the front side 10*a*, the top side 10*b*, the back wall 10*c*, and a pair of first and second end walls 10*d* and 10*e* joining the back wall along first and second back upright edges.

Hinge receiving means are on the first upright back edge of said housing, said means comprising a reinforced flange 11, in which a number of elongated slots are made.

Hinge insertion means 12 are provided on the second upright back edge of the housing, said means being made up of short, wide and curved tabs 12*a*, corresponding both as regards their position and number to the slots in the flange 11. The slots in the flange 11 and the tabs 12 are shown to be two in number, but it is to be understood that their number can change with no alteration of the working principle. The coupling of the slotted fin with said tabs results practically in a proper hinge, with the possibility of disengaging the hinged members quickly and easily.

Figure 4:
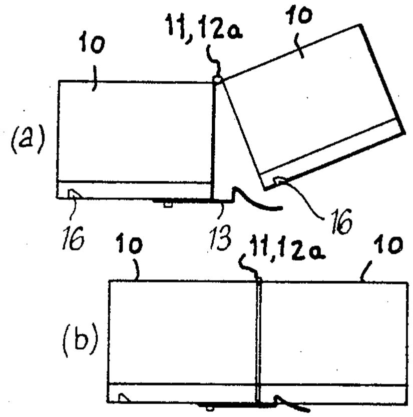

With reference now to FIGS. 3 and 4, it can be seen that a hook device 13 is fastened at a position close to a front side corner of said housing, for instance by means of a rivet, a screw or the like, said hook device consisting of a small curved plate as shown in FIG. 3 having a ramp portion 14 and a tooth 15. Said small plate 13 is made of resilent metal, so that, when two housings are mounted side by side, the edge of the adjacent housing, sliding on the ramp portion 14, will cause the small plate 13 to be deflected towards the outside and, once the housings are fully in a side by side position, the tooth 15 of the small plate 13 will snap so as to engage in as recess 16 provided on the adjacent housing, the recess 16 serving as a hook receiving complementary to said small plate 13.

According to a different embodiment, the small metal plate 13 has a ramp portion 14 but, instead of the tooth 15, it has a hole which receives small pivot that protrudes from the body of the adjacent housing, said hole performing the function of the recess 16 of the other embodiment.

Obviously, it is possible to make use of other hooking devices, for instance of the latch type or of the hook-and-eyelet type, with no alteration of the working principle.

Figure 2:
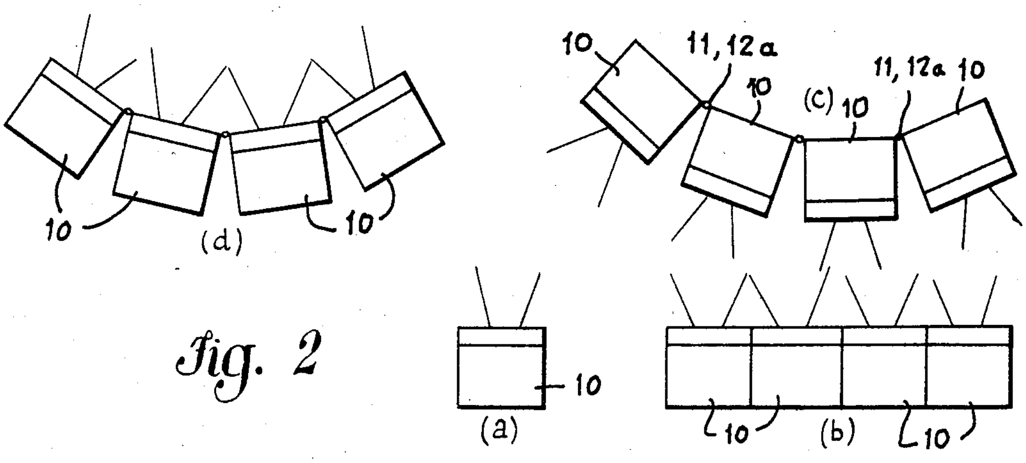

With reference now to FIGS. 1 and 2, it can be seen that said housing may be employed as a single-component unit, or otherwise in the form of a combination as desired, for instance in the form of a two or four component unit. Moreover, it can be seen that, employing both the back hinge means 11, 12 and the front hook device 13, 16, combined housings in a row can be oriented in any direction, in particular as shown in FIG. 2(*b*) or they can be arranged in a convex row in order to distribute the light projected through a given arc as shown in FIG. 2(*c*), or they can be arranged in a concave row in order to concentrate the light on a minor zone, as shown in FIG. 2(*d*).

As regards and electric power supply, each lamp can have an independent connection means, so that the lamps can be connected to the supply in any combination and in any desired way.

What is claimed is:

1. A plurality of lamp housing modules particularly for lighting in theaters, photographs, motion picture or television studios, the housing modules each having a front side, a top side, a back wall, and a pair of first and second end walls, the back wall joining said end walls along first and second back upright edges, said housing modules each having a lighting window on said front side and ventilation louvers on said top side and containing a bulb and mirror set, a flange member at said first upright edge of each housing module having slots forming hinge receiving means, tab members extending from said second upright edge forming hinge insertion means insertable into said slots of the flange members of an adjacent like housing module to form a hinge therewith, a hook device extending from and close to a lower portion of said front side and a hook receiving means complementary to said hook device at a lower portion of said front side of an adjacent like housing module, whereby a plurality of said housings may be connected into a housing row of desired configuration.

2. A lamp housing as claimed in claim 1, wherein said hook device consists of a resilient clip plate having one end riveted to the housing and a hooked other end projecting outside the housing, said hook receiving means consisting of a recess provided at the lower portion of said front side of the housing and adapted to engage said hooked end of the resilient clip plate of the adjacent housing.

* * * * *